(12) United States Patent
Moriwaki et al.

(10) Patent No.: US 12,034,901 B2
(45) Date of Patent: Jul. 9, 2024

(54) INFORMATION PROCESSING APPARATUS, INFORMATION PROCESSING SYSTEM, INFORMATION PROCESSING METHOD, AND NON-TRANSITORY RECORDING MEDIUM

(71) Applicants: Atsushi Moriwaki, Kanagawa (JP); Yukiko Maeo, Kanagawa (JP)

(72) Inventors: Atsushi Moriwaki, Kanagawa (JP); Yukiko Maeo, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 0 days.

(21) Appl. No.: 18/051,930

(22) Filed: Nov. 2, 2022

(65) Prior Publication Data
US 2023/0291863 A1    Sep. 14, 2023

(30) Foreign Application Priority Data

Dec. 24, 2021  (JP) .................................. 2021-211635

(51) Int. Cl.
*H04N 1/60*  (2006.01)
*H04N 1/54*  (2006.01)

(52) U.S. Cl.
CPC ............. *H04N 1/54* (2013.01); *H04N 1/6022* (2013.01)

(58) Field of Classification Search
CPC ....... H04N 1/54; H04N 1/6022; H04N 1/6033
See application file for complete search history.

(56) References Cited

U.S. PATENT DOCUMENTS

| 10,326,915 | B2 * | 6/2019 | Choulet | H04N 1/6008 |
| 2002/0024609 | A1 | 2/2002 | Matsushima | |
| 2008/0002216 | A1 | 1/2008 | Matsushima | |
| 2009/0147313 | A1 | 6/2009 | Miyagi et al. | |
| 2009/0168108 | A1 | 7/2009 | Matsushima | |
| 2010/0177357 | A1 * | 7/2010 | Yoshida | G06K 15/407 358/3.21 |
| 2011/0063699 | A1 * | 3/2011 | Ishizuka | H04N 1/6058 358/530 |

(Continued)

FOREIGN PATENT DOCUMENTS

| JP | 2012105233 A * | 5/2012 | ............... H04N 1/62 |
| JP | 2014-035419 | 2/2014 | |

(Continued)

*Primary Examiner* — Ted W Barnes
(74) *Attorney, Agent, or Firm* — Harness, Dickey & Pierce, P.L.C.

(57) ABSTRACT

An information processing apparatus includes circuitry to derive, referring to a dictionary in which a target color having brightness and gloss is associated with a combination of amounts of color materials including one or more process color materials and a color material having brightness and gloss, amounts of the one or more process color materials and another amount of another color material, such that an amount corresponding to at least a part of the one or more process color materials corresponding to the target color in the dictionary is replaced with the another amount of the another color material. The combination of the amounts of color materials is for reproducing the target color included in an image formed by an image forming apparatus. The circuitry further updates the dictionary with the amounts of the one or more process color materials and the another amount of the another color material.

18 Claims, 11 Drawing Sheets

(56) References Cited

U.S. PATENT DOCUMENTS

| | | | |
|---|---|---|---|
| 2012/0320393 A1* | 12/2012 | Ito | H04N 1/54 358/1.9 |
| 2014/0043623 A1* | 2/2014 | Koyatsu | G03G 15/0121 358/1.1 |
| 2014/0043625 A1* | 2/2014 | Koyatsu | G06K 15/18 358/1.9 |
| 2016/0086067 A1* | 3/2016 | Shibasaki | G06K 15/1878 358/1.9 |
| 2017/0064150 A1* | 3/2017 | Moribe | H04N 1/6019 |
| 2017/0227904 A1* | 8/2017 | Matsuoka | H04N 1/54 |
| 2018/0316826 A1* | 11/2018 | Ogura | B41J 2/2114 |
| 2018/0367702 A1* | 12/2018 | Kubo | G03G 9/0926 |
| 2018/0367705 A1* | 12/2018 | Yamauchi | H04N 1/622 |
| 2019/0037085 A1* | 1/2019 | Inaba | H04N 1/6097 |
| 2019/0068838 A1* | 2/2019 | Tashiro | G01J 3/526 |
| 2019/0075221 A1* | 3/2019 | Kubo | G01J 3/46 |
| 2019/0080479 A1* | 3/2019 | Totsuka | G06F 3/12 |
| 2019/0082079 A1* | 3/2019 | Watanabe | G06F 3/1247 |
| 2019/0260912 A1 | 8/2019 | Matsushima | |
| 2021/0014384 A1* | 1/2021 | Matsuoka | H04N 1/6055 |
| 2021/0029270 A1 | 1/2021 | Matsushima | |
| 2021/0329144 A1 | 10/2021 | Matsushima et al. | |
| 2022/0070335 A1 | 3/2022 | Matsushima | |
| 2022/0377204 A1* | 11/2022 | Watanabe | H04N 1/6008 |
| 2023/0004768 A1* | 1/2023 | Kubo | H04N 1/54 |

FOREIGN PATENT DOCUMENTS

| | | | | |
|---|---|---|---|---|
| JP | 2014035419 A | * | 2/2014 | G03G 15/6582 |
| JP | 2015-075590 | | 4/2015 | |
| JP | 2015075590 A | * | 4/2015 | |
| JP | 2016-061947 | | 4/2016 | |
| JP | 5910405 B2 | * | 4/2016 | G03G 15/0121 |
| JP | 2016061947 A | * | 4/2016 | B41J 2/2117 |
| JP | 2019004322 A | * | 1/2019 | G03G 15/0105 |
| JP | 2019047337 A | * | 3/2019 | G01J 3/46 |

* cited by examiner

FIG. 9

| COLOR NAME | L* | a* | b* | F.I. | C | M | Y | K | Si |
|---|---|---|---|---|---|---|---|---|---|
| PANTONE 8020C | 58.17 | 5.74 | 10.01 | 7.0 | 0 | 64 | 76 | 44 | 201 |
| PANTONE 8644C | 61.33 | 1.94 | 61.47 | 0.4 | 0 | 63 | 255 | 88 | 102 |
| PANTONE 10267C | 35.96 | -8.47 | -18.22 | -0.1 | 223 | 87 | 47 | 139 | 247 |

INFORMATION PROCESSING APPARATUS, INFORMATION PROCESSING SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-211635, filed on Dec. 24, 2021, in the Japan Patent Office, the entire disclosure of which is hereby incorporated by reference herein.

BACKGROUND

Technical Field

The present disclosure relates to an information processing apparatus, an information processing system, an information processing method, and a non-transitory recording medium.

Related Art

In a technique of electrophotographic printing in recent years, the range of color representation can be expanded by using a color material of special color, in addition to color materials of cyan (C), magenta (M), yellow (Y), and black (K) which has been used. For example, a color image having a glossy appearance can be formed by using a metallic color material having metallic luster such as gold toner or silver toner, or a pearl color material representing a pearlescent color, or a glitter color material such as a mica color material. Such materials that have high brightness and gloss may be referred to as color materials having brightness and gloss. In the specification, the color based on a color material having brightness and gloss may be referred to as a metallic color for convenience. In a related art, for printing the metallic colors, offset printing using color materials having brightness and gloss has been mainly used.

In a known art for performing offset printing using a metallic toner to reproduce a metallic color, when color materials of C, M, Y, and K and a metallic color material are stacked in a manner that the metallic color material is arranged at an underlay position, two types of metallic color material are used for the purpose of suppressing reduction of degree of brightness and gloss, such as degree of metallic luster, occurring in a case that an amount of process color materials is large. In such a known art, one of the two types of metallic color material is used for the underlay position, and the other one is used for an overlay position, and the amount of process color materials is not changed. This changes the amount of metallic color material to adjust the degree of brightness and gloss, while the color reproducibility is maintained to some extent.

In another known art, in a case of reproducing a metallic color, an amount of process color materials is adjusted by Under Color Removal (UCR) processing in order to suppress reduction of degree of brightness and gloss, such as degree of metallic luster, according to reduction in the orientation of the metallic color material due to a large amount of the process color materials. With this, the degree of brightness and gloss, such as the degree of metallic luster, is adjusted while the color reproducibility is maintained to some extent.

SUMMARY

An embodiment of the present disclosure includes an information processing apparatus including circuitry to derive, referring to a dictionary in which a target color having brightness and gloss is associated with a combination of amounts of color materials including one or more process color materials and a color material having brightness and gloss, amounts of the one or more process color materials and another amount of another color material, such that an amount corresponding to at least a part of the one or more process color materials corresponding to the target color in the dictionary is replaced with the another amount of the another color material. The combination of the amounts of color materials is for reproducing the target color included in an image formed by an image forming apparatus. The circuitry updates the combination of the amounts of color materials associated with the target color in the dictionary with the amounts of the one or more process color materials and the another amount of the another color material that are derived, to reproduce the target color.

An embodiment of the present disclosure includes an information processing system including an information processing apparatus and an image forming apparatus. The information processing apparatus includes circuitry to derive, referring to a dictionary in which a target color having brightness and gloss is associated with a combination of amounts of color materials including one or more process color materials and a color material having brightness and gloss, amounts of the one or more process color materials and another amount of another color material, such that an amount corresponding to at least a part of the one or more process color materials corresponding to the target color in the dictionary is replaced with the another amount of the another color material. The combination of the amounts of color materials is for reproducing the target color included in an image formed by an image forming apparatus. The circuitry updates the combination of the amounts of color materials associated with the target color in the dictionary with the amounts of the one or more process color materials and the another amount of the another color material that are derived, to reproduce the target color. The image forming apparatus performs print output in relation to the target color based on the dictionary.

An embodiment of the present disclosure includes an information processing method including deriving, referring to a dictionary in which a target color having brightness and gloss is associated with a combination of amounts of color materials including one or more process color materials and a color material having brightness and gloss, amounts of the one or more process color materials and another amount of another color material, such that an amount corresponding to at least a part of the one or more process color materials corresponding to the target color in the dictionary is replaced with the another amount of the another color material. The combination of the amounts of color materials is for reproducing the target color included in an image formed by an image forming apparatus. The method includes updating the combination of the amounts of color materials associated with the target color in the dictionary with the amounts of the one or more process color materials and the another amount of the another color material that are derived, to reproduce the target color.

An embodiment of the present disclosure includes a non-transitory recording medium storing a plurality of instructions which, when executed by one or more processors, causes the processors to perform a method. The method includes deriving, referring to a dictionary in which a target color having brightness and gloss is associated with a combination of amounts of color materials including one or more process color materials and a color material having brightness and gloss, amounts of the one or more process color materials and another amount of another color material, such that an amount corresponding to at least a part of the one or more process color materials corresponding to the target color in the dictionary is replaced with the another amount of the another color material. The combination of the amounts of color materials is for reproducing the target color included in an image formed by an image forming apparatus. The method includes updating the combination of the amounts of color materials associated with the target color in the dictionary with the amounts of the one or more process color materials and the another amount of the another color material that are derived, to reproduce the target color.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 9 is a diagram illustrating an example of a spot color dictionary according to the first embodiment;

Figure 1:
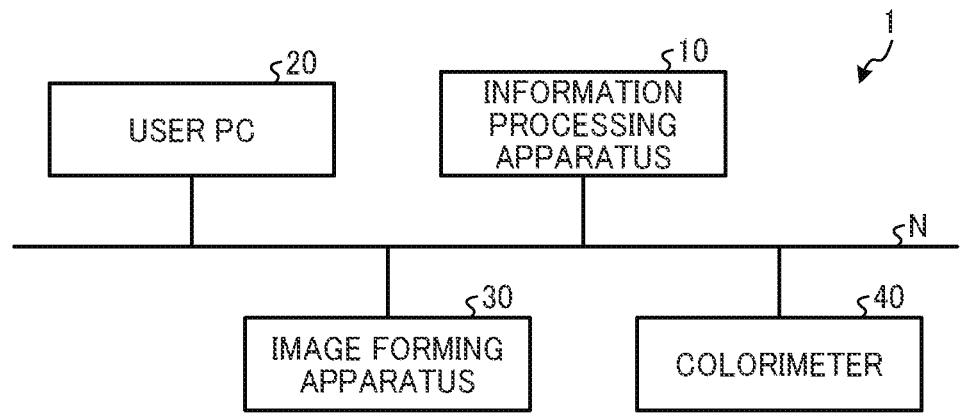
FIG. 1 is a block diagram illustrating an example of an overall configuration of an information processing system according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing apparatus, an information processing system, an information processing method, and a non-transitory recording medium storing an information processing program according to embodiments of the present disclosure are described below with reference to the accompanying drawings. The present invention is not limited by the following embodiments, and the constituent elements in the following embodiments include those which can be easily conceived by those skilled in the art, substantially the same one, and so-called equivalent ranges. Various omissions, substitutions, changes, and combinations of constituent elements can be made without departing from the gist of the following embodiments.

Figure 15:
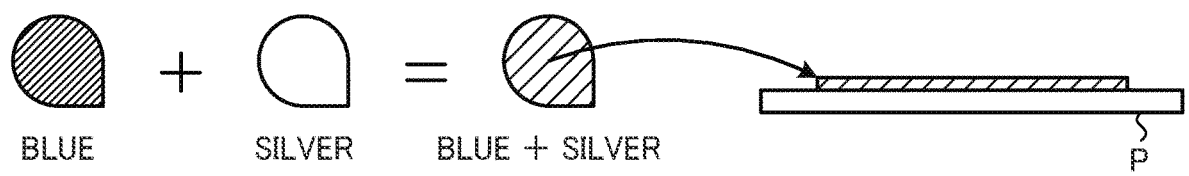
FIG. 15 is a diagram for describing offset printing according to a related art.

In offset printing according to a related art, color sample patches are commercially available for the purpose of printing an ideal metallic color, and a user specifies a color by using the color sample patches. As illustrated in FIG. 15, color materials are mixed to reproduce a color corresponding to a color sample patch, and printing using the mixed color materials is performed by a printing company. Each color registered in a color sample book is referred to as a spot color.

Figure 16:
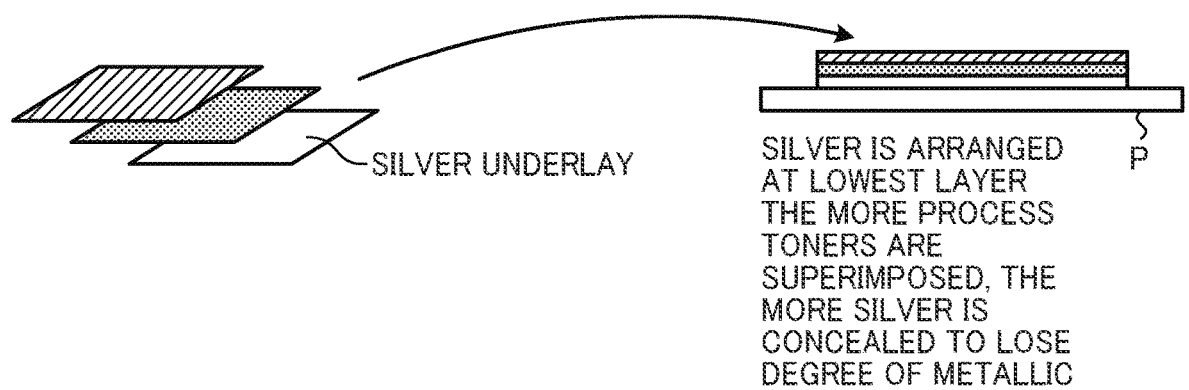
FIG. 16 is a diagram for describing electrophotographic printing according to a related art.

In electrophotographic printing according to a related art, as illustrated in FIG. 16, toner layers of respective colors are stacked to form an image. With the electrophotographic printing, on-demand printing can be performed without mixing color materials, which is different from the offset printing. However, in the electrophotographic printing, a toner color of a lower layer is covered and shielded by another toner color of an upper layer, depending on the stack order of the toners. In addition, in general, metallic toners using metals have higher shielding properties than process color toners using pigments. Accordingly, the metallic toner is often arranged in the lowermost layer closest to a sheet of paper (underlay position, underlay).

First Embodiment

Overall Configuration of Information Processing System:

FIG. 1 is a block diagram illustrating an example of an overall configuration of an information processing system 1 according to a first embodiment. The overall configuration of the information processing system 1 according to the present embodiment is described below with reference to FIG. 1.

As illustrated in FIG. 1, the information processing system 1 includes an information processing apparatus 10, a user personal computer (PC) 20, an image forming apparatus 30, and a colorimeter 40.

The information processing apparatus 10, the user PC 20, the image forming apparatus 30, and the colorimeter 40 can communicate with each other via a network N such as a local area network (LAN).

The information processing apparatus 10 receives a colorimetric value of a target metallic color (target color) obtained by color measurement performed by the colorimeter 40, calculates a metallic value and a color value based on the colorimetric value, derives device values (amounts of color materials) including a device value of Si (metallic silver), and creates a spot color dictionary (dictionary) in which the derived device values and the target metallic color are associated with each other. The information processing apparatus 10 is a PC or an information processing apparatus of digital front end (DFE) that includes a workstation.

The target metallic color includes, for example, colors of color numbers 599 to 621 of the DIC color guide, and colors of metallic patches of a color sample book formed by offset printing, such as the PANTONE Metallic Coated Guide. The device values indicate device values corresponding to five colors including Si that is metallic silver and process colors including cyan (C), magenta (M), yellow (Y), and black (K). Further, having a "high metallic value" has substantially the same meaning as having "high degree of brightness and gloss," or having "high degree of metallic luster." In addition, having "strong (high) color tone," or having a "high color value" has substantially the same meaning as having "high saturation" or having "high intensity" (being "deep"). Further, the information processing apparatus 10 receives a print job from the user PC 20, and performs color conversion to convert a spot color specified in the print job into the device values corresponding to the five colors. Hereinafter, the device values corresponding to the five colors may be referred to as five-color device values.

The user PC 20 is an information processing apparatus that transmits a print job to the information processing apparatus 10 and displays a status indicating such as a processing result.

The image forming apparatus 30 is a printer that performs print output of image data under the control of the information processing apparatus 10. In the present embodiment, the image forming apparatus 30 is described as an apparatus that performs a printing operation by electrophotographic printing.

The colorimeter 40 is a device such as a multi-angle spectral colorimeter that performs color measurement with respect to a metallic patch of a target metallic color from a plurality of directions and transmits an obtained colorimetric value to the information processing apparatus 10.

Figure 2:
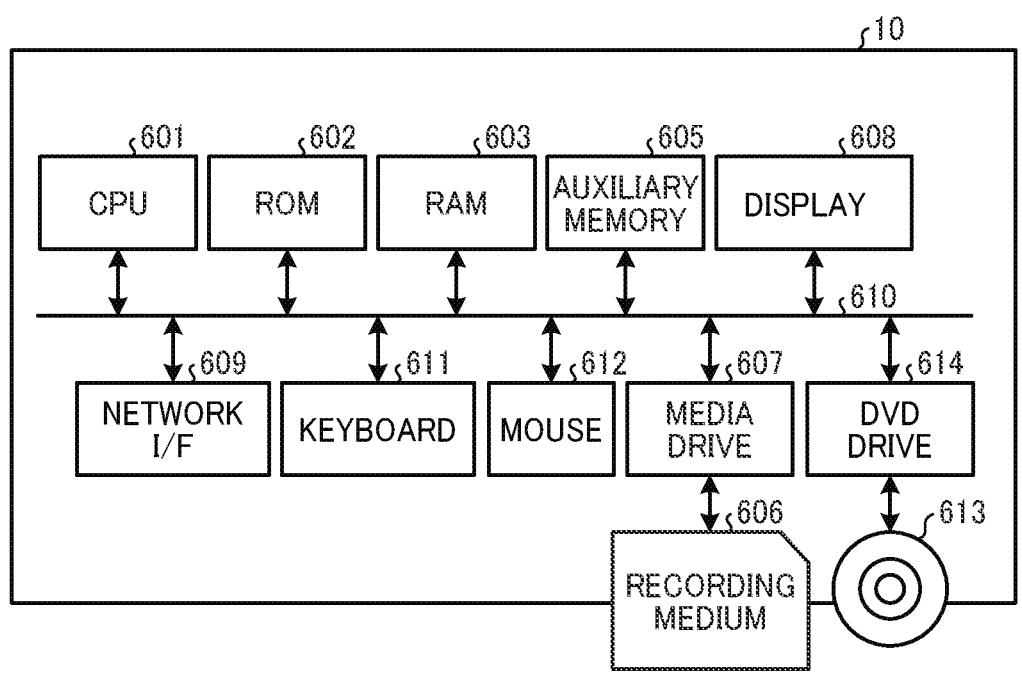
FIG. 2 is a block diagram illustrating an example of a hardware configuration of an information processing apparatus according to the first embodiment.

Hardware Configuration of Information Processing Apparatus:

FIG. 2 is a block diagram illustrating an example of a hardware configuration of the information processing apparatus 10 according to the first embodiment. The hardware configuration of the information processing apparatus 10 according to the present embodiment is described below with reference to FIG. 2.

As illustrated in FIG. 2, the information processing apparatus 10 includes a central processing unit (CPU) 601, a read only memory (ROM) 602, a random access memory (RAM) 603, an auxiliary memory 605, a media drive 607, a display 608, a network I/F 609, a keyboard 611, a mouse 612, and a digital versatile disc (DVD) drive 614.

The CPU 601 is a computing device that controls the overall operation of the information processing apparatus 10. The ROM 602 is a nonvolatile storage device that stores a program for the information processing apparatus 10. The RAM 603 is a volatile storage device used as a working area of the CPU 601.

The auxiliary memory 605 is a storage device such as a hard disc drive (HDD) or a solid state drive (SSD) that stores a color prediction model and a spot color dictionary, which will be described later, various data, and various programs. The media drive 607 is a device that controls reading and writing from and to a recording medium 606 such as a flash memory under the control of the CPU 601.

The display 608 is a display device including a liquid crystal and an organic electro-luminescence (EL) that display various information such as a cursor, a menu, a window, characters, or an image.

The network I/F 609 is an interface for performing data communication with the user PC 20 and an external device such as the colorimeter 40 using the network N. The network I/F 609 is, for example, a network interface card (NIC) compliant with ETHERNET and can establish communications in compliance with Transmission Control Protocol (TCP)/Internet protocol (IP).

The keyboard 611 is an input device used for selecting characters, numbers, or various commands, and for moving a cursor, for example. The mouse 612 is an input device for selecting and executing various instructions, selecting a processing object, and moving a cursor, for example.

The DVD drive 614 is a device that reads or writes data with respect to a DVD 613 such as a DVD-ROM or a digital versatile disk recordable (DVD-R), which is an example of a removable storage medium (recording medium).

The CPU 601, the ROM 602, the RAM 603, the auxiliary memory 605, the media drive 607, the display 608, the network interface (I/F) 609, the keyboard 611, the mouse 612, and the DVD drive 614 are communicably connected to each other through a bus line 610 such as an address bus or a data bus.

The hardware configuration of the information processing apparatus 10 illustrated in FIG. 2 is just one example, and the information processing apparatus 10 may not include all of the components illustrated in FIG. 2, or may include any other hardware components. A hardware configuration of the user PC 20 is substantially the same as or similar to the hardware configuration illustrated in FIG. 2.

Figure 3:
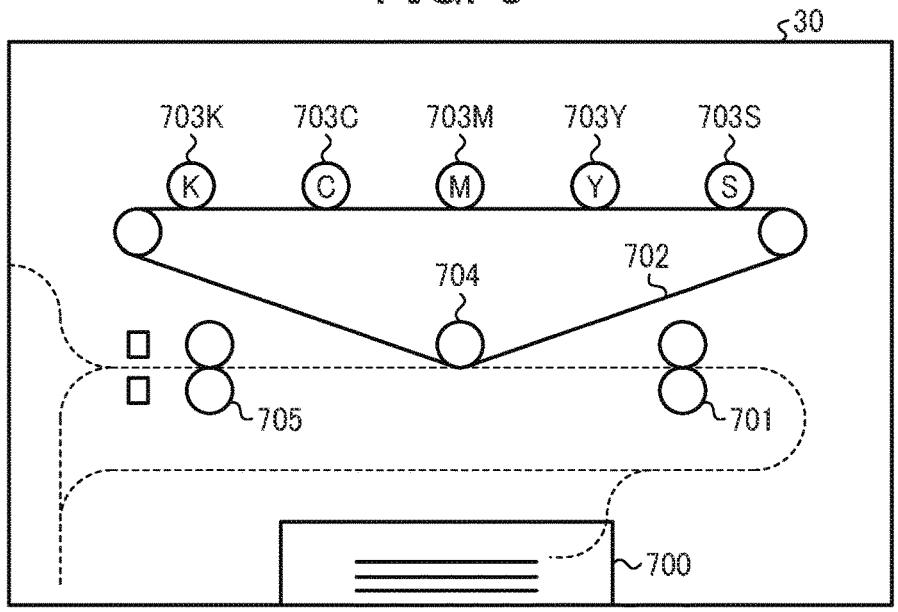
FIG. 3 is a diagram illustrating an example of a hardware configuration of an image forming apparatus according to the first embodiment.

Hardware Configuration of Image Forming Apparatus:

FIG. 3 is a diagram illustrating an example of a hardware configuration of the image forming apparatus 30 according to the first embodiment. The hardware configuration of the image forming apparatus 30 according to the present embodiment is described below with reference to FIG. 3.

As illustrated in FIG. 3, the image forming apparatus 30 is, for example, a tandem-type printer, and includes a sheet feeding tray 700, a conveyance roller 701, an intermediate transfer belt 702, photoconductor drums 703C, 703M, 703Y, 703K, and 703S, a transfer roller 704, and a fixing roller 705.

The sheet feeding tray 700 is a tray in which recording media such as sheets of paper to be fed are stored. The conveyance roller 701 is a pair of rollers that convey a recording medium fed from the sheet feeding tray 700 to the transfer roller 704 along a conveyance path.

The intermediate transfer belt 702 is an endless belt on which an intermediate transfer image is formed by the photoconductor drums 703C, 703M, 703Y, 703K, and 703S. The intermediate transfer belt 702 rotates clockwise in FIG. 3, and toner images of the respective colors are formed with the photoconductor drums 703K, 703C, 703M, 703Y, and 703S in this order.

The photoconductor drum 703C is a photoconductor drum that forms a cyan toner image on the intermediate transfer belt 702. The photoconductor drum 703M is a photoconductor drum that forms a magenta toner image on the intermediate transfer belt 702. The photoconductor drum 703Y is a photoconductor drum that forms a yellow toner image on the intermediate transfer belt 702. The photoconductor drum 703K is a photoconductor drum that forms a black toner image on the intermediate transfer belt 702. The photoconductor drum 703S is a photoconductor drum that forms a special color toner image on the intermediate transfer belt 702. The special color includes a color of metallic color material having metallic luster such as gold toner and silver toner, a pearlescent color of pearl color material, and a glitter color of glitter color material such as a mica color material. Such materials that have high brightness and gloss may be referred to as color materials having brightness and gloss. In the description of embodiments, silver toner, which is a metallic color material, is used as a color material for the special color material. However, other color materials having brightness and gloss as described above may be used. In order to form an intermediate transfer image on the intermediate transfer belt 702, the photoconductor drums 703S, 703Y, 703M, 703C, and 703K are arranged in this order from the upstream side in the rotation direction of the intermediate transfer belt 702. Accordingly, the respective colors are formed on a surface of the intermediate transfer belt 702, and as a result, a full-color image is formed as an intermediate transfer image. The photoconductor drums 703C, 703M, 703Y, 703K, and 703S are simply referred to as "photoconductor drum 703" when any photoconductor drum is indicated or when they are collectively referred to. With respect to the photoconductor drum 703, colors of C, M, Y, and K are applied as process colors, however, colors of C, M, and Y may be used as the process colors, or R (red), B (blue), and G (green) may be used as the process colors in alternative to the colors of C, M, and Y.

The transfer roller 704 is a roller that transfers the full-color image (intermediate transfer image) formed on the intermediate transfer belt 702 onto the recording medium conveyed by the conveyance roller 701. By the function of the transfer roller 704, the full-color image is formed (printed) on the recording medium.

In this case, due to the order of forming the respective colors of the intermediate transfer image on the intermediate transfer belt 702 described above, the full-color image formed on the recording medium has a metallic color layer as the lowermost layer, and the metallic color material is used for an "underlay position," or used as an "underlay."

The fixing roller 705 is a roller for fixing an image on a recording medium on which a full-color image has been formed.

Figure 4:
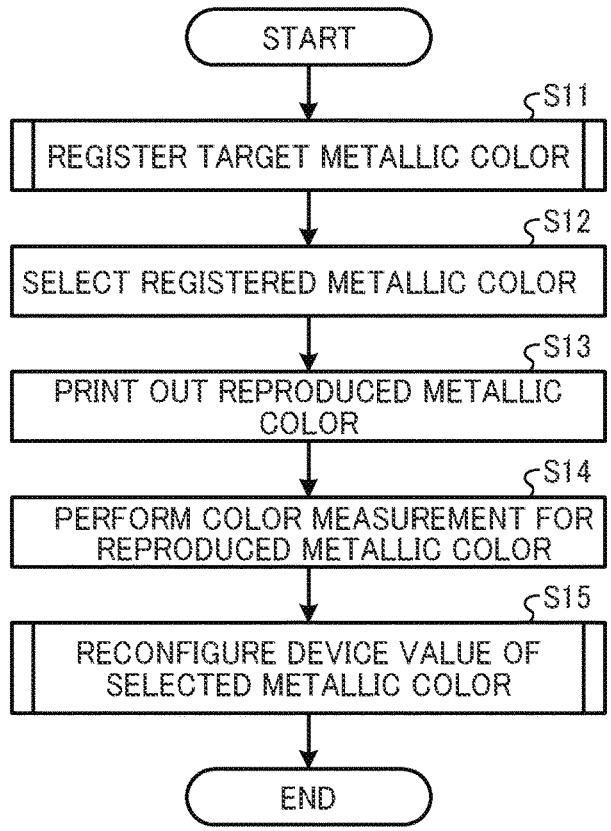
FIG. 4 is a flowchart illustrating an example of an overall operation of the information processing system according to the first embodiment.
Figure 5A:
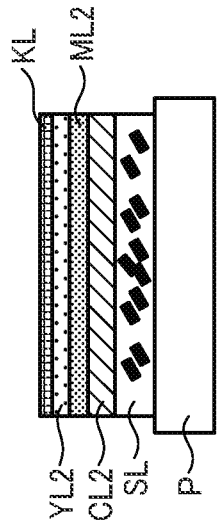
FIGS. 5A and 5B are diagrams for describing an operation of replacing color materials of C, M, and Y with a color material of K for improving degree of brightness and gloss according to the first embodiment.
Figure 5B:
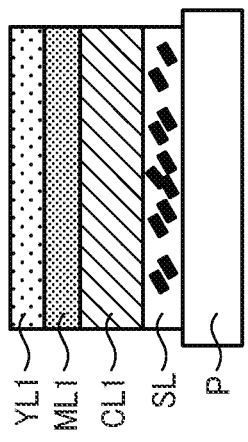

Overall Operation of Information Processing System:

FIG. 4 is a flowchart illustrating an example of an overall operation of the information processing system 1 according to the first embodiment. FIGS. 5A and 5B are diagrams for describing an operation of replacing color materials of C, M, and Y with a color material of K for improving the degree of brightness and gloss. The overall operation of the information processing system 1 according to the present embodiment is described below with reference to FIGS. 4, 5A and 5B.

Step S11:

First, the information processing apparatus 10 calculates a metallic value and a color value based on a colorimetric value obtained by the colorimeter 40, which performs color measurement with respect to a patch of a target metallic color. In addition, the information processing apparatus 10 registers, in the spot color dictionary, the metallic value and the color value in association with the five-color device values relevant to the image forming apparatus 30. Details of a process of registering the target metallic color performed by the information processing apparatus 10 is described later with reference to FIG. 10. Then, the process proceeds to S12.

Step S12:

Next, the information processing apparatus 10 selects a metallic color registered in the spot color dictionary. Then, the process proceeds to S13.

Step S13:

Then, the information processing apparatus 10 transmits to the image forming apparatus 30 image data (for example, metallic patch data) representing a color for reproducing the target metallic color (the color may be referred to as a reproduced metallic color) (reproduced color) by using the five-color device values corresponding to the selected metallic color in the spot color dictionary, and causes the image forming apparatus 30 to print out the image data. Then, the process proceeds to S14.

Step S14:

The colorimeter 40 performs color measurement with respect to the patch of the reproduced metallic color printed out by the image forming apparatus 30 to obtain a colorimetric value, and transmits the colorimetric value to the information processing apparatus 10. Then, the process proceeds to S15.

Step S15:

Based on the colorimetric value of the reproduced metallic color received from the colorimeter 40, the information processing apparatus 10 reconfigures the five-color device values for the metallic color selected in step S12, and updates the spot color dictionary. Specifically, when the metallic value of the reproduced metallic color is lower than the metallic value of the target metallic color by a predetermined value or more, the information processing apparatus 10 reconfigures the five-color device values such that the metallic value increases without changing the color value. The predetermined value may be set by, for example, a user, or a designer. For example, as illustrated in FIGS. 5A and 5B, the information processing apparatus 10 replaces a part of the device values of C, M, and Y (an example of a part of one or more color materials) with the device value of K (an example of another color material) while maintaining a composition ratio of the device values of C, M, and Y configuring the reproduced metallic color. Maintaining the composition ratio of the device values of C, M, and Y may indicate that the composition ratio is strictly the same or that the composition ratio is maintained to the extent that the composition ratio can be regarded as substantially the same.

FIG. 5A illustrates a layer structure of color materials in a case where print output is performed so as to reproduce the target metallic color using the created spot color dictionary in step S13. Specifically, a cyan toner layer CL1, a magenta toner layer ML1, and a yellow toner layer YL1 are formed in this order on a silver toner layer SL that is formed on a print sheet as an underlay (at an underlay position). FIG. 5B illustrates a layer structure of color materials in a case where a part of the device values of C, M, and Y configuring the reproduced metallic color is replaced with the device value of K while the composition ratio of the device values of C, M, and Y is maintained in step S15, and print output is performed. At this time, since the amount of color material corresponding to the part of the device values of C, M, and Y to be replaced with the device value of K is greater than the amount of color material corresponding to the replaced device value of K, a total amount of the process color materials becomes less. In other words, device values for forming a cyan toner layer CL2, a magenta toner layer ML2, and a yellow toner layer YL2 are set while the composition ratio of the device values based on the cyan toner layer CL1, the magenta toner layer ML1, and the yellow toner layer YL1 configuring the reproduced metallic color in FIG. 5A is maintained, and a part of the device value based on the cyan toner layer CL1, the magenta toner layer ML1, and the yellow toner layer YL1 is replaced with the device value for forming a black toner layer KL.

As a result, since the amount of process color material corresponding to the process colors that conceal the silver toner that is the metallic color material is reduced without changing the color value, the metallic value is closer to the target, resulting in improving the degree of brightness and gloss while maintaining the color reproducibility. Details of the process of reconfiguring the device values for the metallic color, performed by the information processing apparatus 10 is described later with reference to FIG. 11.

The overall operation is performed by the information processing system 1 through step S11 to step S15 described above.

Figure 6:
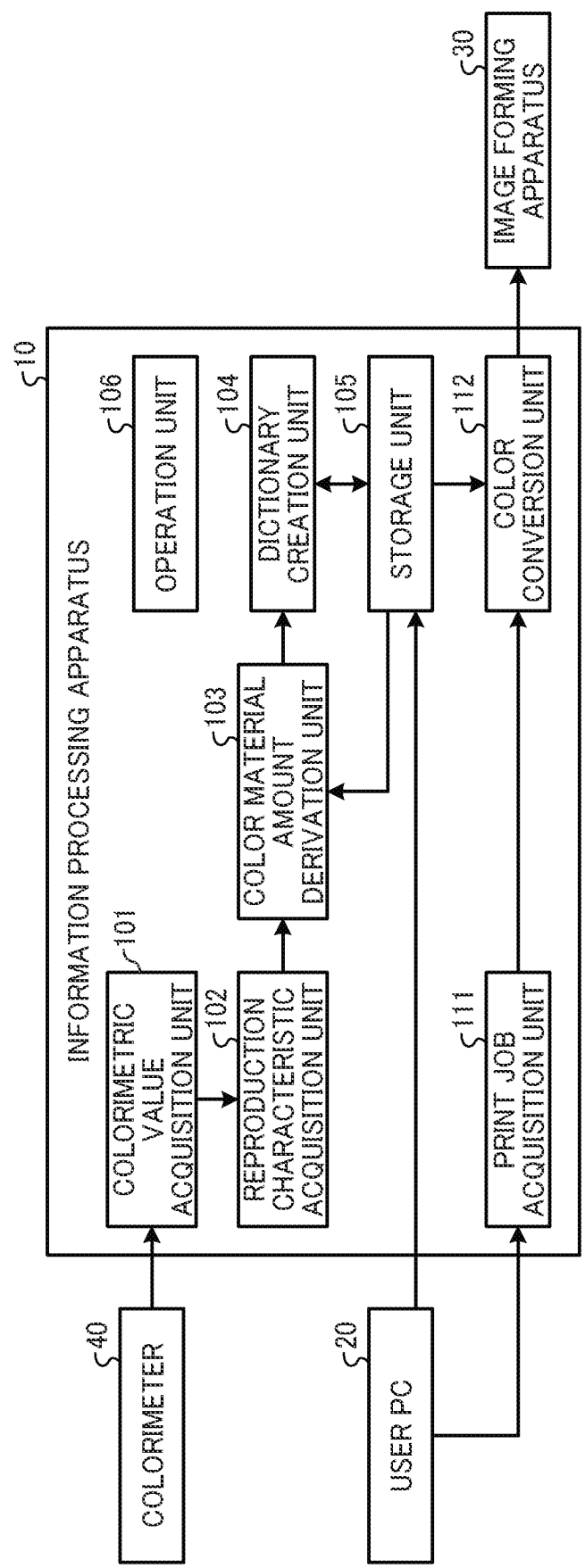
FIG. 6 is a block diagram illustrating an example of a functional configuration of the information processing apparatus according to the first embodiment.
Figure 7:
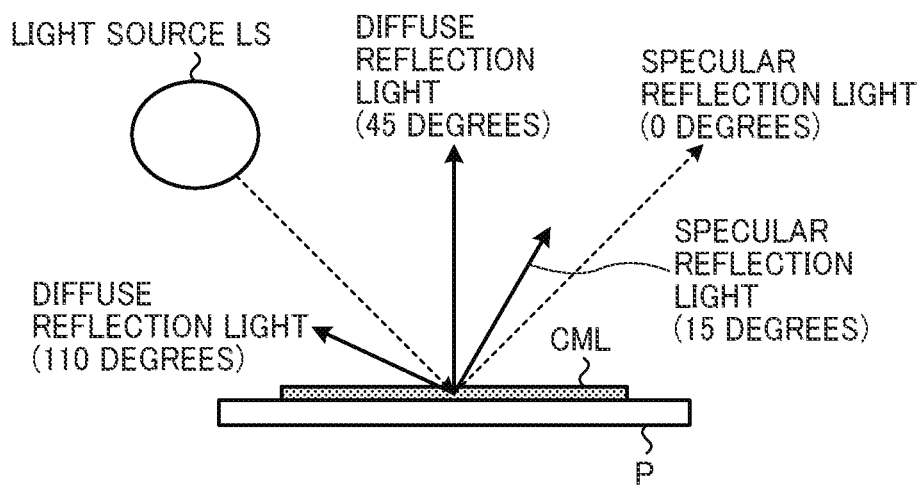
FIG. 7 is a diagram for describing a color measurement operation by a colorimeter according to the first embodiment.
Figure 8:
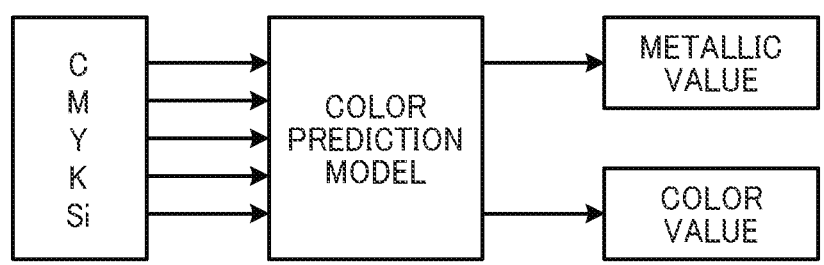
FIG. 8 is a diagram for describing a color prediction model according to the first embodiment.

Configuration and Operation of Functional Blocks of Information Processing Apparatus:

FIG. 6 is a block diagram illustrating an example of a functional configuration of the information processing apparatus 10 according to the first embodiment. FIG. 7 is a diagram for describing a color measurement operation by the colorimeter 40 according to the first embodiment. FIG. 8 is a diagram for describing the color prediction model according to the first embodiment. FIG. 9 is a diagram illustrating an example of a spot color dictionary. The configuration and operation of functional blocks of the information processing apparatus 10 according to the present embodiment is described below with reference to FIGS. 6 to 9.

As illustrated in FIG. 6, the information processing apparatus 10 includes a colorimetric value acquisition unit 101 (first acquisition unit), a reproduction characteristic acquisition unit 102 (calculation unit), a color material amount derivation unit 103 (derivation unit), a dictionary creation unit 104 (an example of an update unit), a storage unit 105, an operation unit 106, a print job acquisition unit 111, and a color conversion unit 112.

The colorimetric value acquisition unit 101 is a functional unit that obtains, via the network I/F 609, a plurality of colorimetric values obtained by performing color measurement with respect to each patch of the target metallic color and the reproduced metallic color from a plurality of directions by using the colorimeter 40, and transmits the obtained colorimetric values to the reproduction characteristic acquisition unit 102. With reference to FIG. 7, the color measurement operation performed by the colorimeter 40 is described in detail. The colorimeter 40 is a multi-angle spectral colorimeter, and performs a color measurement process in a case where light emitted from a light source LS in an oblique direction (a direction of 45 degrees with respect to a normal line) is reflected by a color material layer CML formed on the print sheet P (an example of a recording medium) and a direction of specular reflection light is set to 0 degree to obtain a colorimetric value in a direction of 15 degrees, a colorimetric value in a direction of 45 degrees corresponding to diffuse reflection light, and a colorimetric value in a direction of 110 degrees corresponding to diffuse reflection light. Each of the colorimetric values is a value based on spectral reflectance in the corresponding direction.

The colorimetric value acquisition unit 101 acquires the colorimetric values in the directions of 15 degrees, 45 degrees, and 110 degrees measured by the colorimeter 40 with respect to each patch of the target metallic color and the reproduced metallic color as described above.

The reproduction characteristic acquisition unit 102 is a functional unit that calculates a metallic value and a color value, which are two physical quantities (evaluation values), based on the plurality of colorimetric values received from the colorimetric value acquisition unit 101, and transmits the metallic value and the color value to the color material amount derivation unit 103. The metallic value (first characteristic value) is a physical quantity obtained by digitizing the degree of brightness and gloss of a measurement object measured by the colorimeter 40, and is generally a value calculated using colorimetric values measured in the plurality of directions. The color value (second characteristic value) is a physical quantity obtained by digitizing the degree of color tone (chromaticity) of a measurement object measured by the colorimeter 40. In the present embodiment, for example, the metallic value is described as a flop index (F.I) that is generally used as a method for measuring color with optical anisotropy. The metallic value and the color value are used as values indicating reproduction characteristics of the target metallic color.

As illustrated in FIG. 7, the flop index is basically calculated by the following expression (1) in which L values among Lab values obtained by performing color measurement in the directions of 15 degrees, 45 degrees, and 110 degrees in the case where the direction of specular reflection light of light emitted by the light source LS from the direction of 45 degrees with respect to the normal line is defined as 0 degrees are used, and in which the difference between the L value at 15 degrees and the L value at 110 degrees is normalized by the L value at 45 degrees.

$$F.I = 2.69 \cdot (L^*_{15} - L^*_{110})^{1.11} / (L^*_{45})^{0.85}$$ Expression (1):

In the expression (1), F.I represents a flop index, L*15 represents the L value in the direction of 15 degrees, L*45 represents the L value in the direction of 45 degrees, and L*110 represents the L value in the direction of 110 degrees. The flop index F.I is a physical quantity of which the higher the value is, the higher the degree of brightness and gloss is. On the other hand, the color value is a Lab value representing saturation and intensity in the direction of 45 degrees, which is an index that has been used. The metallic value is not limited to the flop index, and may be replaced with another index value or evaluation value.

The color material amount derivation unit 103 is a functional unit that derives five-color device values (C, M, Y, K, and Si values) relevant to the image forming apparatus 30, which is a reproduction printer, based on the metallic value and the color value calculated by the reproduction characteristic acquisition unit 102 using the color prediction model stored in the storage unit 105, and transmits the five-color device values together with the metallic value and the color value to the dictionary creation unit 104.

A description is given below of a process in relation to the color prediction model with reference to FIG. 8. The color prediction model is a model in which five-color device values (C, M, Y, K, Si) are input and a metallic value and a color value of a metallic color, which is a color of which reproduction by the image forming apparatus 30 is predicted, are output. The color prediction model includes a metallic value prediction model that is a model outputting the metallic value of the metallic color of which reproduction is predicted based on the five-color device values, and a color value prediction model that is a model outputting the color value of the metallic color of which reproduction is predicted based on the five-color device values. In the case of the present embodiment, the metallic value prediction model outputs, as the metallic value the flop index represented by the expression (1) described above, and the color value prediction model outputs, as the color value, the Lab value representing the saturation and intensity in the direction of 45 degrees.

A description is given below of a method of creating the color prediction model. First, color patches each of which has a corresponding combination of the five-color device values, namely each color patch has a combination of five-color device values and the combination is different from that of the other patches, are printed out by the image forming apparatus 30. Then, for each color patch, the corresponding colorimetric value is obtained by performing color measurement in the plurality of directions by the colorimeter 40 as illustrated in FIG. 7. As a result, the metallic value and the color value are obtained for each color patch. Then, based on the values, the metallic value prediction model for obtaining the metallic value by inputting the five-color device values, and the color value prediction model for obtaining the color value are created. As a function used for the color prediction model including the metallic value prediction model and the color value prediction model, a general function as a color prediction model, interpolation using a multiple regression equation, a neural network, or a direct lookup table, can be used. The color prediction model created as described above is stored in the storage unit 105. Note that the color prediction model may be a model corresponding to each sheet of paper used in the image forming apparatus 30.

The dictionary creation unit 104 is a functional unit that reads information on a target metallic color (spot color) from the storage unit 105, creates the spot color dictionary in which the information on the target metallic color (for example, a color name of the target metallic color) is associated with the metallic value, the color value, and the five-color device values received from the color material amount derivation unit 103, and stores the spot color dictionary in the storage unit 105. In this case, when the spot color dictionary of the target metallic color has already been created in the storage unit 105, the dictionary creation unit 104 may update the five-color device values in the spot color dictionary. For example, as illustrated in FIG. 9, the dictionary creation unit 104 creates the spot color dictionary by associating the information on the target metallic color (Color Name), the color value (L*, a*, b*), the metallic value (F. I), and the five-color device values (C, M, Y, K, Si).

The storage unit 105 is a functional unit that stores the spot color dictionary created by the dictionary creation unit 104, the information on the target metallic color (for example, a color name), and the color prediction model, for example.

The storage unit 105 is implemented by the auxiliary memory 605 illustrated in FIG. 2.

The operation unit 106 is a functional unit that receives an input operation. The operation unit 106 may receive an operation performed with respect to the colorimeter 40 in addition to an operation performed with respect to the information processing apparatus 10. The operation unit 106 is implemented by the keyboard 611 and the mouse 612 illustrated in FIG. 2.

The print job acquisition unit 111 is a functional unit that obtains a print job from, for example, the user PC 20, and transmits the print job to the color conversion unit 112.

The color conversion unit 112 is a functional unit that uses the spot color dictionary stored in the storage unit 105 to perform color conversion to convert a spot color specified by the print job received from the print job acquisition unit 111 into the five-color device values. The color conversion unit 112 transmits image data obtained by the color conversion process to the image forming apparatus 30 via the network I/F 609.

The colorimetric value acquisition unit 101, the reproduction characteristic acquisition unit 102, the color material amount derivation unit 103, the dictionary creation unit 104, the print job acquisition unit 111, and the color conversion unit 112 described above are implemented by programs executed by the CPU 601 illustrated in FIG. 2. At least a part of functional units implemented by software (program) among the functional units of the information processing apparatus 10 illustrated in FIG. 6 may be implemented by a hardware circuit such as a field-programmable gate array (FPGA) or an application specific integrated circuit (ASIC).

Each functional unit of the information processing apparatus 10 illustrated in FIG. 6 is a conceptual representation of a function, and the functional configuration of the information processing apparatus 10 is not limited thereto. For example, a plurality of functional units, each of which is illustrated as an independent unit of the information processing apparatus 10 in FIG. 6, may be collectively configured as one functional unit. In addition, or alternatively, one or more of the plurality of functional units of the information processing apparatus 10 illustrated in FIG. 6 may be divided into a plurality of functional units.

Figure 10:
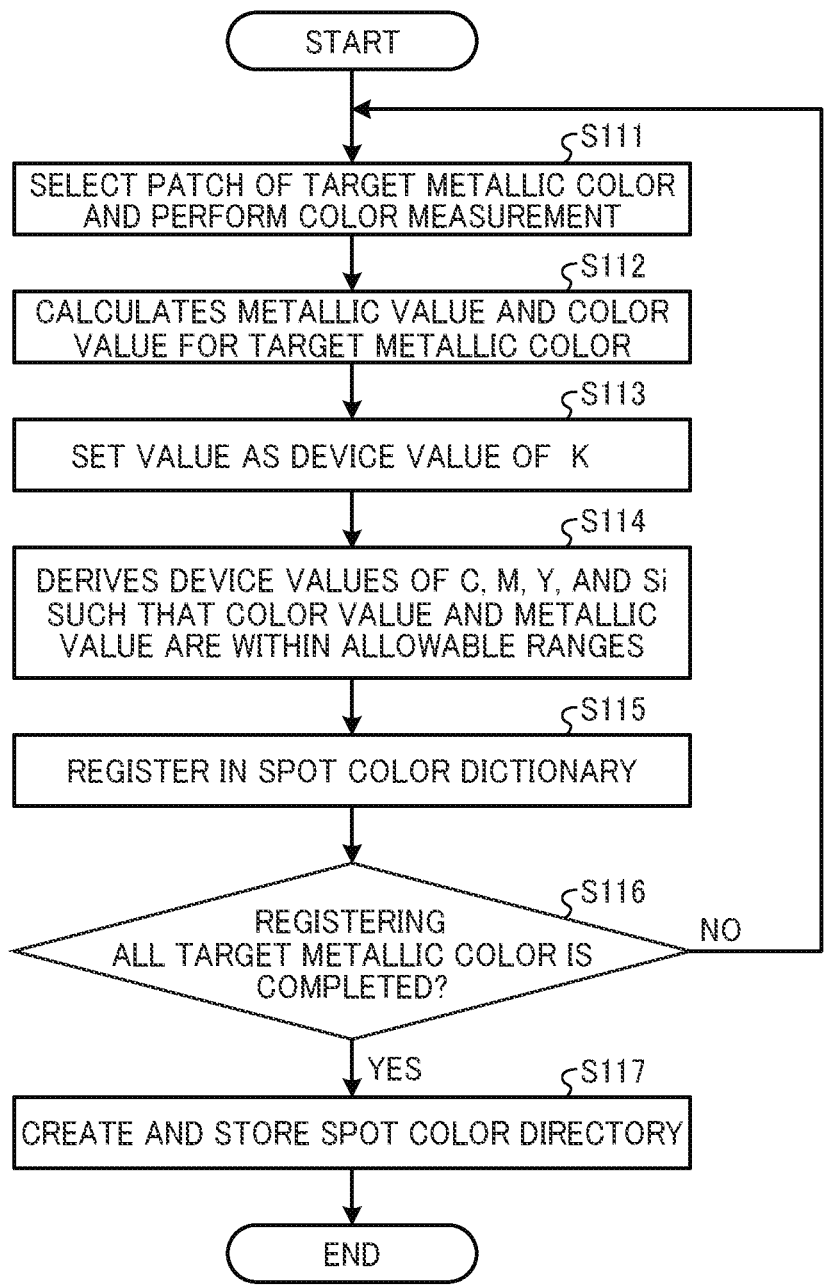
FIG. 10 is a flowchart illustrating an example of a process of registering a target metallic color, performed by the information processing apparatus according to the first embodiment.

Process of Registering Target Metallic Color:

FIG. 10 is a flowchart illustrating an example of a process of registering a target metallic color, performed by the information processing apparatus 10 according to the first embodiment. The process of registering a target metallic color performed by the information processing apparatus 10 according to the present embodiment is described below with reference to FIG. 10. The process of registering a target metallic color corresponds to the processing of step S11 in FIG. 4.

Step S111:

According to a user operation, a plurality of patches to be the target metallic color is selected from the color sample book, and color measurement is performed on the plurality of patches by the colorimeter 40. Then, the colorimetric value acquisition unit 101 of the information processing apparatus 10 acquires, via the network I/F 609, a plurality of colorimetric values obtained by the color measurement performed with respect to each patch of the target metallic color from a plurality of directions by the colorimeter 40, and transmits the acquired colorimetric values to the reproduction characteristic acquisition unit 102. Then, the process proceeds to step S112.

Step S112:

The reproduction characteristic acquisition unit 102 of the information processing apparatus 10 calculates the metallic value and the color value, which are two physical quantities (evaluation values), based on the plurality of colorimetric values received from the colorimetric value acquisition unit 101, and transmits the values to the color material amount derivation unit 103. Then, the process proceeds to step S113.

Step S113:

The color material amount derivation unit 103 of the information processing apparatus 10 sets, or configures, an arbitrary value as the device value of K for the target metallic color. Then, the process proceeds to step S114.

Step S114:

Then, the color material amount derivation unit 103 derives the device values of C, M, Y, and Si using the color prediction model stored in the storage unit 105 such that the metallic value and the color value are within allowable ranges without changing the configured device value of K. For example, the color material amount derivation unit 103 formally derives the five-color device values, in a case that the metallic value and the color value obtained by using the color prediction model based on the five-color device values that are provisionally derived (a current value of the device value of K is used as it is) are within the respective allowable ranges that are within ±predetermined values of the acquired metallic value and the acquired color value, respectively. The predetermined value may be set by, for example, a user or a designer. Then, the color material amount derivation unit 103 transmits the derived five-color device values (including the device value of K, which is set (configured)) and the metallic value and the color value received from the reproduction characteristic acquisition unit 102 to the dictionary creation unit 104. Then, the process proceeds to step S115.

Step S115:

The dictionary creation unit 104 of the information processing apparatus 10 reads the information on the target metallic color (spot color) selected in step S111 from the storage unit 105, and registers, in the spot color dictionary, the information on the target metallic color (for example, the color name of the target metallic color) by associating with the metallic value, the color value, and the five-color device values received from the color material amount derivation unit 103.

Then, the process proceeds to step S116.

Step S116:

When the processing of steps S111 to S115 is completed for all the target metallic colors (step S116: Yes), the process proceeds to step S117, and when the processing is not completed (step S116: No), the process returns to step S111.

Step S117:

The directory creation unit 104 creates the spot color directory by registering all the target metallic colors in the spot color directory through the processing of steps S111 to S115, and stores the spot color directory in the storage unit 105.

The process of registering of the target metallic color is performed through the processing of steps S111 to S117 described above.

Figure 11:
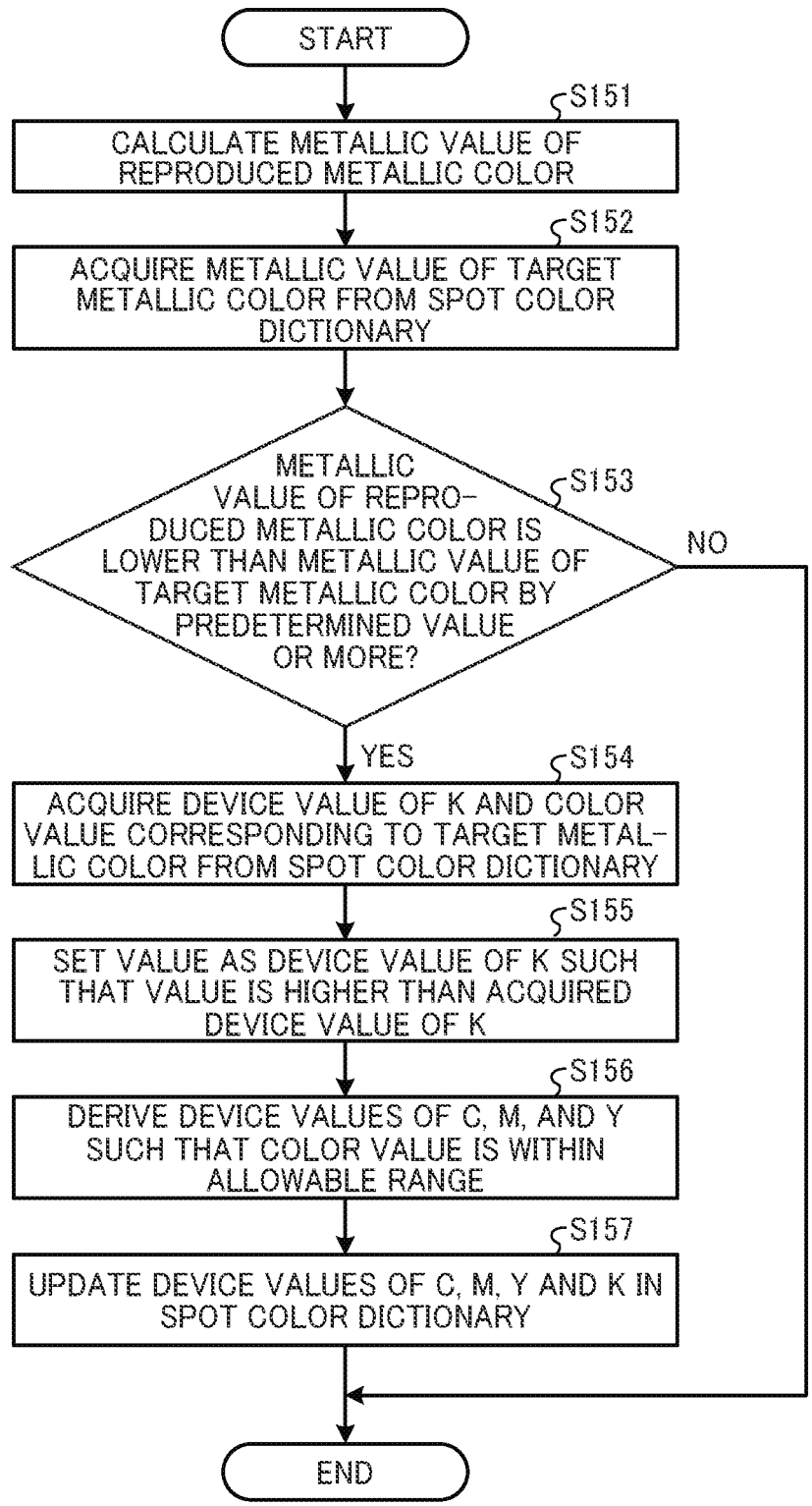
FIG. 11 is a flowchart illustrating an example of a process of reconfiguring device values for a metallic color, performed by the information processing apparatus according to the first embodiment.

Process of Reconfiguring Device Values for Metallic Color:

FIG. 11 is a flowchart illustrating an example of a process of reconfiguring the device values for the metallic color, performed by the information processing apparatus 10 according to the first embodiment. The process of reconfiguring the device values for the metallic color performed by the information processing apparatus 10 according to the present embodiment is described below with reference to FIG. 11. The process of reconfiguring the device values for the metallic color corresponds to the processing of step S15 in FIG. 4.

Step S151:

The reproduction characteristic acquisition unit 102 calculates a metallic value based on the colorimetric value of the reproduced metallic color received from the colorimeter 40, and transmits the metallic value to the color material amount derivation unit 103. Then, the process proceeds to step S152.

Step S152:

The color material amount derivation unit 103 acquires the metallic value of the target metallic color corresponding to the reproduced metallic color from the spot color dictionary stored in the storage unit 105, namely the information processing apparatus 10 refers to the spot color dictionary to obtain the metallic value of the target metallic color. Then, the process proceeds to step S153.

Step S153:

The color material amount derivation unit 103 determines whether the metallic value of the reproduced metallic color received from the reproduction characteristic acquisition unit 102 is lower than the acquired metallic value of the target metallic color by a predetermined value or more. When the metallic value of the reproduced metallic color is lower than the metallic value of the target metallic color by the predetermined value or more (Step S153: Yes), the process proceeds to Step S154. When the metallic value of the reproduced metallic color is not lower than the metallic value of the target metallic color by the predetermined value or more (Step S153: No), the process ends while the device values in the spot color dictionary is kept as they are.

Step S154:

The color material amount derivation unit 103 acquires the device value of K and the color value that are corresponding to the target metallic color from the spot color dictionary stored in the storage unit 105, namely the information processing apparatus 10 refers to the spot color dictionary to obtain the device value of K. Then, the process proceeds to step S155.

Step S155:

Then, the color material amount derivation unit 103 reconfigures the device value of K corresponding to the target metallic color such that the value is higher than the acquired device value of K. Then, the process proceeds to step S156.

Step S156:

The color material amount derivation unit 103 uses the color prediction model stored in the storage unit 105 to derive the device values of C, M, and Y such that the color value is within the allowable range without changing the reconfigured device value of K. For example, the color material amount derivation unit 103 formally derives the five-color device values, in a case that the color value obtained by using the color prediction model based on the five-color device values that are provisionally derived (current values of the device values of K and Si are used as they are) are within the allowable range that is within ±predetermined values of the acquired color value.

The color material amount derivation unit 103 may acquire the device values of C, M, and Y corresponding to the target metallic color from the spot color dictionary, reconfigure the device values of C, M, and Y to be lower than the current values, and derive the device value of K such that the color value is within the allowable range without changing the reconfigured device values of C, M, and Y.

The color material amount derivation unit 103 may derive the device values of C, M, and Y by replacing the part of the device values of C, M, and Y with an increased amount of the device value of K that is increased by reconfiguring while maintaining the composition ratio of the device values of C, M, and Y corresponding to the target metallic color in the spot color dictionary. The color material amount derivation unit 103 may further acquire the device values of C, M, and Y corresponding to the target metallic color from the spot color dictionary, and replace the device values of the three colors corresponding to the same device value as the minimum device value among the device values corresponding to the three colors with the device value of K corresponding to the same device value as the minimum device value.

Then, the color material amount derivation unit 103 transmits the derived five-color device values (including the reconfigured device value of K) and the color values received from the reproduction characteristic acquisition unit 102 to the dictionary creation unit 104.

Figure 12A:
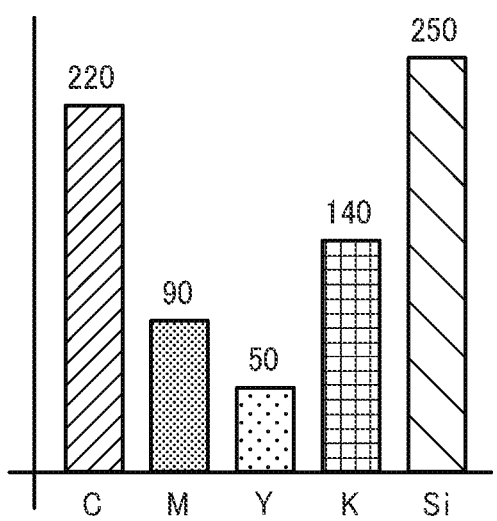
FIGS. 12A and 12B are diagrams for describing an operation of reconfiguring the device values for the metallic color, according to the first embodiment.
Figure 12B:
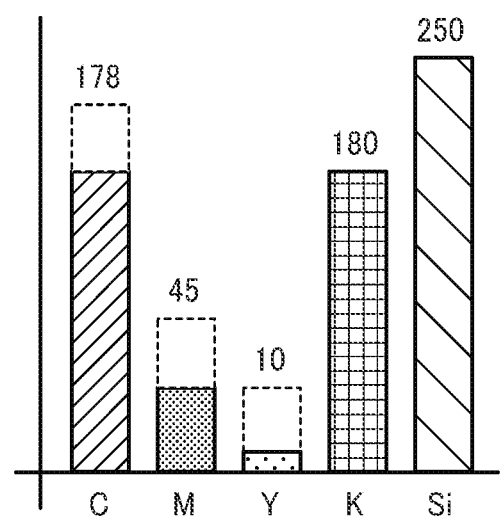

FIGS. 12A and 12B are graphs illustrating an example of a configuration of the five-color device values, and for describing an operation of reconfiguring (deriving again) the device values for the metallic color in steps S155 and S156. FIG. 12A illustrates an example of a configuration of the five-color device values before reconfiguring, and FIG. 12B illustrates an example of the five-color device values after reconfiguring. As illustrated in FIG. 12B, the device value of K is reconfigured to have a value higher than that in FIG. 12A, and due to this, each of the device values of C, M, and Y is set to be lower than that in FIG. 12A in order to keep the color value to be within the allowable range. Accordingly, since the total amount of the color materials of C, M, and Y is reduced, the concealment ratio of the color material of Si is lowered. This improves the metallic value (improve the degree of brightness and gloss) while maintaining the color value. Although the device values of C, M, and Y are derived from the reconfigured device value of K by using the color prediction model such that the color value is within the allowable range, the device values of C, M, and Y may be derived by simple under color removal (UCR) processing.

Then, the process proceeds to step S157.

Step S157:

The dictionary creation unit 104 updates the five-color device values for the target metallic color corresponding to the reproduced metallic color in the spot color dictionary with the reconfigured five-color device values (that are derived again) by the color material amount derivation unit 103.

The process of reconfiguring the device values for the metallic color is performed through the processing of steps S151 to S157 described above.

As described above, the information processing apparatus 10 according to the present embodiment obtains the device values of the process color materials and the metallic value color material that are used for forming (printing) an image by the image forming apparatus 30. As described above, in order to reproduce a target metallic color by using the spot color dictionary in which the target metallic color having brightness and gloss is associated with a combination of the device values (amounts) of the process color materials and the metallic color material for reproducing the target metallic color, the color material amount derivation unit 103 derives the device values of the process color materials and the device value of a color material so as to replace a part of the device values of at least a part of the process color materials (for example, color materials of C, M, and Y) in the dictionary with the device value of the other color material (for example, the color material of K). As described above, the dictionary creation unit 104 updates the device values for the target metallic color in the spot color dictionary with the device values reconfigured (derived again) by the color material amount derivation unit 103. Accordingly, even when the degree of brightness and gloss of the reproduced color is lower than that of the target metallic color, the degree of brightness and gloss can be improved while the color reproducibility is maintained by using one type of metallic color material.

Second Embodiment

The information processing system 1 according to a second embodiment is described below by focusing on differences from the information processing system 1 according to the first embodiment. In the first embodiment, whether the metallic value of the reproduction metallic value is lower than the metallic value of the target metallic color by the predetermined value or more is automatically determined. In the present embodiment, the degree of brightness (including metallic luster) and gloss of the target metallic color and the degree of brightness and gloss (including metallic luster) of the reproduced metallic color are visually compared with each other, and the device values of C, M, and Y are replaced with the device value of K based on a determination result obtained by the comparison. Note that the overall configuration of the information processing system 1 according to the present embodiment and hardware configurations of an information processing apparatus 10a, the user PC 20, and the image forming apparatus 30 are similar to or substantially the same as those described in the first embodiment. In addition, the overall operation of the information processing system 1 according to the present embodiment and a process of registering of a target metallic color, performed by the 10a of the information processing apparatus are substantially the same as the operations described in the first embodiment.

Figure 13:
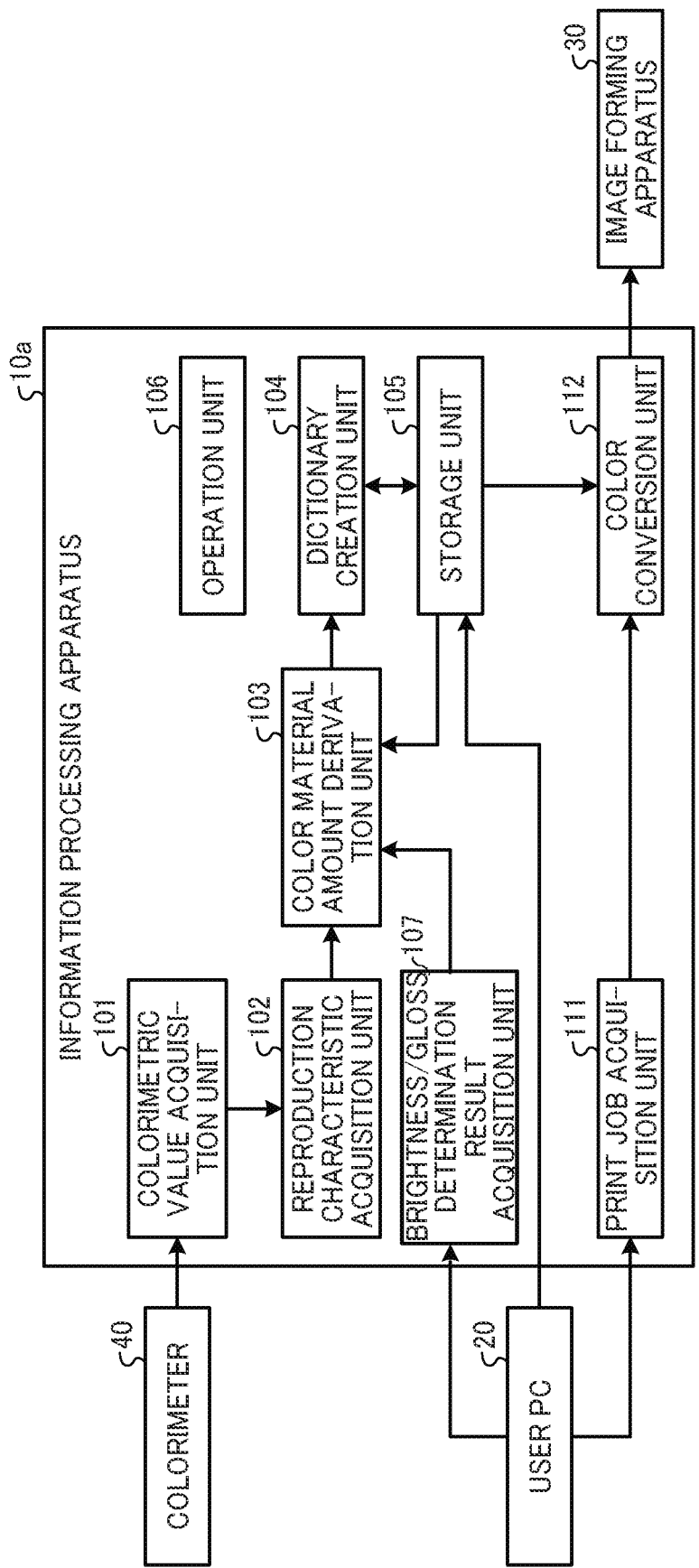
FIG. 13 is a block diagram illustrating an example of a functional configuration of an information processing apparatus according to a second embodiment.

Configuration and Operation of Functional Blocks of Information Processing Apparatus:

FIG. 13 is a block diagram illustrating an example of a functional configuration of the information processing apparatus 10a according to the second embodiment. The configuration and operation of functional blocks of the information processing apparatus 10a according to the present embodiment is described below with reference to FIG. 13.

As illustrated in FIG. 13, the information processing apparatus 10a includes the colorimetric value acquisition unit 101 (first acquisition unit), the reproduction characteristic acquisition unit 102 (calculation unit), the color material amount derivation unit 103 (derivation unit), the dictionary creation unit 104 (an example of an update unit), the storage unit 105, the operation unit 106, a brightness/gloss determination result acquisition unit 107, the print job acquisition unit 111, and the color conversion unit 112. A user compares a patch of the target metallic color in the color sample book with a patch of the reproduced metallic color (step S13 illustrated in FIG. 4) printed out using the created spot color dictionary, determines whether the degree of brightness and gloss of the reproduced metallic color is lower than the degree of brightness and gloss of the target metallic color, and inputs a determination result (hereinafter, referred to as a brightness and gloss determination result, or simply referred to as a brightness determination result) to the user PC 20.

The brightness/gloss determination result acquisition unit 107 is a functional unit that acquires the brightness and gloss determination result from the user PC 20 via the network I/F 609 and transmits the brightness and gloss determination result to the color material amount derivation unit 103.

The operations of the functional units other than the brightness/gloss determination result acquisition unit 107 in the information processing apparatus 10a are substantially the same as the operations described in the first embodiment.

Figure 14:
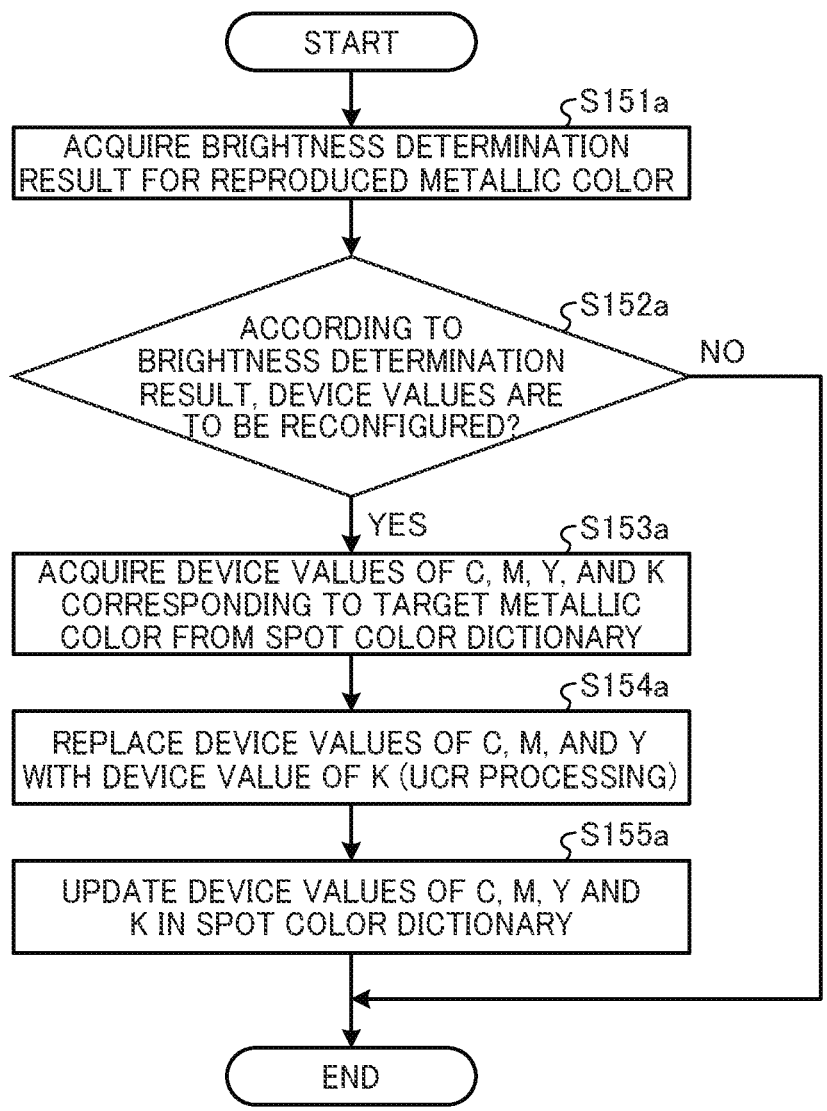
FIG. 14 is a flowchart illustrating an example of a process of reconfiguring the device values for the metallic color, performed by the information processing apparatus according to the second embodiment.

Process of Reconfiguring Device Values for Metallic Color:

FIG. 14 is a flowchart illustrating an example of a process of reconfiguring the device values for the metallic color, performed by the information processing apparatus 10a according to the second embodiment. The process of reconfiguring the device values for the metallic color performed by the information processing apparatus 10a according to the present embodiment is described below with reference to FIG. 14.

The process of reconfiguring the device values for the metallic color corresponds to the processing of step S15 in FIG. 4.

Step S151a:

According to a user operation, the brightness and gloss determination result is input to the user PC 20, after the user visually compares a patch of the target metallic color in the color sample book with a patch of the reproduced metallic color (step S13 illustrated in FIG. 4) printed out using the created spot color dictionary, and determines whether the degree of brightness and gloss of the reproduced metallic color is lower than the degree of brightness and gloss of the target metallic color. The brightness/gloss determination result acquisition unit 107 of the information processing apparatus 10a acquires the brightness and gloss determination result from the user PC 20 via the network I/F 609, and transmits the brightness and gloss determination result to the color material amount derivation unit 103. Then, the process proceeds to step S152a.

Step S152a:

The color material amount derivation unit 103 of the information processing apparatus 10a determines whether to reconfigure device values based on the brightness and gloss determination result acquired from the brightness/gloss determination result acquisition unit 107. When the determinization result indicates to reconfigure the device values (step S152a: Yes), the process proceeds to step S153a, and when the determinization result indicates not to reconfigure the device values (step S152a: No), the process ends.

Step S153a:

The color material amount derivation unit 103 acquires the device values of C, M, Y, and K for the target metallic color corresponding to the reproduced metallic color from the spot color dictionary stored in the storage unit 105, namely the information processing apparatus 10a refers to the spot color dictionary to obtain the device values of C, M, Y, and K for the target metallic color. Then, the process proceeds to step S154a.

Step S154a:

The color material amount derivation unit 103 performs, for example, the UCR processing on the acquired device values of C, M, Y, and K to replace a part of the device values of C, M, and Y with the device value of K, thereby reconfiguring (rederiving) the device values of C, M, Y, and K. Then, the color material amount derivation unit 103 transmits the reconfigured device values of C, M, Y, and K to the dictionary creation unit 104. Then, the process proceeds to step S155a.

Step S155a:

The dictionary creation unit 104 updates the device values of C, M, Y, and K for the target metallic color corresponding to the reproduced metallic color in the spot color dictionary with the reconfigured device values of C, M, Y, and K (that are derived again) by the color material amount derivation unit 103.

The process of reconfiguring the device values for the metallic color is performed through the processing of steps S151a to S155a described above.

As described above, in the information processing apparatus 10a according to the present embodiment, the brightness/gloss determination result acquisition unit 107 acquires from the user PC 20 the determination result as to whether the degree of brightness and gloss of the patch of the reproduced metallic color printed out by the image forming apparatus 30 based on the spot color dictionary and reproducing the target metallic color is lower than the degree of brightness and gloss of the patch of the target metallic color, and the color material amount derivation unit 103 derives each amount of the color materials of C, M, Y, and K by performing, for example, the UCR processing on the device values of the process color materials corresponding to the target metallic color in the spot color dictionary based on the brightness and gloss determination result acquired by the brightness/gloss determination result acquisition unit 107. Accordingly, while achieving the same effect as in the first embodiment, the second embodiment in which the determination result obtained by visual check by the user is used can accurately reproduce the brightness and gloss that is the user's desired degree of the brightness and gloss.

In this modification, the information processing apparatus 10a does not use the colorimetric value of the reproduced metallic color and does not calculate the device values based on the colorimetric value. Accordingly, the information processing apparatus 10a may include a spot color dictionary acquisition unit that acquires the spot color dictionary created outside relevant to the image forming apparatus 30.

In addition, in the first embodiment and the second embodiment described above, by increasing the amount of the color material of K, the total amount of the color materials of C, M, and Y is reduced, and the amount of the color material that conceals the metallic color material is reduced, thereby improving the brightness and gloss, but the present disclosure is not limited thereto. For example, the total amount of color materials of C, M, and Y can also be reduced by using a color material (an example of a part of one or more color materials), such as a color material of orange (Or) and a color material of green (Gr), that have an intermediate hue between two colors of C, M, and Y, in alternative to the color material of K, and replacing the amount of a part of color materials of the two colors with the amount of the color material having the intermediate hue (an example of another color material).

In a related art, in order to adjust degree of brightness and gloss, a unit including six photoconductor drums is used, and two types of metallic color materials are used to be prepared, and this increases the cost. In a related art, it is not clear whether a metallic color (reproduced metallic color) obtained by reproducing a target metallic color has the degree of brightness and gloss sufficiently enough equivalent to the target metallic color.

An information processing apparatus, an information processing system, an information processing method, and a program according to an embodiment can improve degree of brightness and gloss of a reproduced color, even when the degree of brightness and gloss of the reproduced color is lower than a target color, by using a single type of color material having brightness and gloss while the color reproducibility is maintained.

According to an embodiment, even when degree of brightness and gloss of a reproduced color is lower than a target color, the degree of brightness and gloss can be improved by using a single type of color material having brightness and gloss while the color reproducibility is maintained.

In each of the embodiments described above, when at least one of the functional units of each of the information processing apparatuses 10 and 10*a* is implemented by a program executed by the CPU, such program may be installed in a ROM or any desired memory of the information processing apparatus in advance. Alternatively, the computer program executed in the information processing apparatus 10 or 10*a* according the above-described embodiments can be provided as a file in an installable format or an executable format and stored in a computer-readable recording medium, such as a compact disc read only memory (CD-ROM), a flexible disk (FD), a compact disc recordable (CD-R), and a digital versatile disk (DVD). Further, the program executed by the information processing apparatus 10 or 10*a* according to the above-described embodiments may be stored on a computer connected to a network such as the Internet, to be downloaded via the network. Further, the computer program executed in the information processing apparatus 10 or 10*a* according the above-described embodiments may be provided or distributed via a network such as the Internet. A program to be executed by the information processing apparatus 10 or 10*a* according to the above-described embodiments has module structure including at least one of the above-described functional units. Regarding the actual hardware related to the program, the CPU 601 reads and executes the program from the memory (e.g., the ROM 602 or the auxiliary memory 605) to load the program onto the main memory (the RAM 603) to implement the above-described functional units.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An apparatus, comprising
circuitry configured to:
refer to a dictionary in which a target color having brightness and gloss is associated with a combination of amounts of color materials including one or more process color materials and a color material having brightness and gloss; and
derive amounts of the one or more process color materials and another amount of another color material, such that an amount corresponding to at least a part of the one or more process color materials corresponding to the target color in the dictionary is replaced with the another amount of the another color material.

2. The apparatus of claim 1, wherein
the circuitry is further configured to:
obtain, via a colorimeter, a colorimetric value measured by the colorimeter with respect to a patch of a reproduced color, the patch of the reproduced color reproducing the target color and being printed out by an image forming apparatus based on the dictionary; and
obtain, for the reproduced color, a first characteristic value and a second characteristic value based on the colorimetric value, the first characteristic value indicating a degree of brightness, and the second characteristic value indicating gloss indicating a degree of color tone,
wherein the target color, the combination of the amounts of color materials, the first characteristic value for the target color, and the second characteristic value for the target color are associated with each other in the dictionary, and
wherein the circuitry is further configured to configure the another amount of the another color material to be higher than a current amount such that the second characteristic value is kept in an allowable range to derive amounts of the part of the one or more process color materials included in the amounts of the one or more process color materials, in response to the first characteristic value for the reproduced color being lower than that of the target color specified in the dictionary by a threshold value or more.

3. The apparatus of claim 1, wherein
the circuitry is further configured to:
obtain, via a colorimeter, a colorimetric value measured by the colorimeter with respect to a patch of a reproduced color, the patch of the reproduced color reproducing the target color and being printed out by an image forming apparatus based on the dictionary; and
obtain, for the reproduced color, a first characteristic value and a second characteristic value based on the colorimetric value, the first characteristic value indicating a degree of brightness, and the second characteristic value indicating gloss indicating a degree of color tone,
wherein the target color, the combination of the amounts of color materials, the first characteristic value for the target color, and the second characteristic value for the target color are associated with each other in the dictionary, and
wherein the circuitry is further configured to configure amounts of the part of the one or more process color materials included in the amounts of the one or more process color materials to be lower than a current amount such that the second characteristic value is kept in an allowable range to derive the another amount of the another color material, in response to the first characteristic value for the reproduced color being lower than that of the target color specified in the dictionary by a threshold value or more.

4. The apparatus of claim 1, wherein
the circuitry is further configured to derive the amounts of the one or more process color materials and the another amount of the another color material while maintaining a composition ratio of the one or more process color materials in amounts of the part of the one or more process color materials included in the amount of the part of the one or more process color materials same as the composition ratio of the one or more process color materials in another amounts of the one or more process color materials corresponding to the target color in the dictionary.

5. The apparatus of claim 1, wherein
the circuitry is further configured to replace the amount corresponding to the part of the one or more process color materials having a same amount as a minimum amount among another amounts of the one or more process color materials corresponding to the target color in the dictionary with the another amount of the another material color having a same amount with the minimum amount to derive the amounts of the one or more process color materials and the another amount of the another color material.

6. The apparatus of claim 1, wherein
the circuitry is further configured to perform under color removal (UCR) processing with respect to another amounts of the one or more process color materials corresponding to the target color in the dictionary to derive the amounts of the one or more process color materials and the another amount of the another color material.

7. The apparatus of claim 1, wherein
the circuitry is further configured to acquire a determination result indicating whether a degree of brightness and a gloss of a patch of a reproduced color reproducing the target color and being printed out by an image forming apparatus based on the dictionary is lower than that of another patch of the target color, and
perform, based on the determination result, UCR processing with respect to another amounts of the one or more process color materials corresponding to the target color in the dictionary to derive the amounts of the one or more process color materials and the another amount of the another color material.

8. The apparatus of claim 1, wherein
the part of the one or more process color materials includes color materials of cyan, magenta, and yellow, and
the another color material includes a color material of black.

9. The apparatus of claim 1, wherein
the part of the one or more process color materials corresponds to two of color materials of cyan, magenta, and yellow, and
the another color material includes a color material having an intermediate hue of the two of the color materials of cyan, magenta, and yellow.

10. An information processing system, comprising:
the apparatus of claim 1; and
an image forming apparatus configured to perform print output in relation to the target color based on the dictionary.

11. The apparatus of claim 1, wherein the combination of the amounts of color materials is for reproducing the target color included in an image formed by an image forming apparatus.

12. The apparatus of claim 1, wherein the circuitry is further configured to reproduce the target color by updating the combination of the amounts of color materials associated with the target color in the dictionary with the amounts of the one or more process color materials and the another amount of the another color material that are derived, to reproduce the target color.

13. A method, comprising:
referring to a dictionary in which a target color having brightness and gloss is associated with a combination of amounts of color materials including one or more process color materials and a color material having brightness and gloss; and
deriving amounts of the one or more process color materials and another amount of another color material, such that an amount corresponding to at least a part of the one or more process color materials corresponding to the target color in the dictionary is replaced with the another amount of the another color material.

14. The method of claim 13, wherein the combination of the amounts of color materials is for reproducing the target color included in an image formed by an image forming apparatus.

15. The method of claim 13, further comprising:
reproducing the target color by updating the combination of the amounts of color materials associated with the target color in the dictionary with the amounts of the one or more process color materials and the another amount of the another color material that are derived, to reproduce the target color.

16. A non-transitory recording medium storing a plurality of instructions which, when executed by one or more processors, causes the processors to perform a method comprising:
referring to a dictionary in which a target color having brightness and gloss is associated with a combination of amounts of color materials including one or more process color materials and a color material having brightness and gloss; and
deriving amounts of the one or more process color materials and another amount of another color material, such that an amount corresponding to at least a part of the one or more process color materials corresponding to the target color in the dictionary is replaced with the another amount of the another color material.

17. The non-transitory recording medium of claim 16, wherein the combination of the amounts of color materials is for reproducing the target color included in an image formed by an image forming apparatus.

18. The non-transitory recording medium of claim 16, wherein the method further comprises:
reproducing the target color by updating the combination of the amounts of color materials associated with the target color in the dictionary with the amounts of the one or more process color materials and the another amount of the another color material that are derived, to reproduce the target color.

* * * * *